Aug. 29, 1950

C. R. PATON 2,520,560

VEHICLE WHEEL

Filed Oct. 5, 1946

CLYDE R. PATON
INVENTOR.

C. C. McRae
R. G. Harris
J. R. Faulkner
T. H. Oster

BY

ATTORNEYS

Patented Aug. 29, 1950

2,520,560

UNITED STATES PATENT OFFICE 2,520,560

VEHICLE WHEEL

Clyde R. Paton, Bloomfield Village, Mich.

Application October 5, 1946, Serial No. 701,472

8 Claims. (Cl. 152—44)

This invention relates generally to vehicle wheels, and more particularly to vehicle wheels of the type in which the wheel disc is insulated from the wheel rim.

An object of the present invention is to provide a vehicle wheel in which the wheel disc and the wheel rim are spaced from each other so that there is no metal to metal contact, and which are connected by a plurality of circumferentially spaced resilient elements which provide the duel function of joining the disc to the rim and of insulating the disc from the rim. Road irregularities encountered by the carcasses of tires which are rotating at high speeds set up vibrations which normally are transmitted through the wheel to the axle, suspension springs, vehicle frame, and finally to the vehicle body. Such vibrations are objectionable since they cause increased wear and strain upon the various parts of the vehicle and since they also result in noises annoying to the occupants of the vehicle.

The vehicle body, being composed of large panels of relatively thin sheet metal, acts as a sounding board when subjected to the vibrations mentioned above. Although present in all vehicles, these body vibrations are intensified in vehicles of the type in which the frame and body are integrally formed as a unit. In other types of vehicles, rubber pucks are generally used between the body and the frame and function to limit the transmission of vibration therebetween. This insulation, however, is not completely effective, since it is located at substantial distances from the wheels, and since the most effective place to stop such vibrations is closely adjacent its source.

The above-mentioned disadvantages of present constructions are overcome by the present invention in which the wheel disc is completely insulated from the wheel rim by means of a plurality of angularly spaced resilient elements, such as rubber blocks, which are interposed between the disc and rim and which form the sole connection therebetween. Inasmuch as this insulation is located as close as mechanically possible to the source of the vibrations, it is extremely effective in stopping such vibrations and preventing their transmittal to the various vehicle parts and to the vehicle body. The rubber blocks can be either cemented to the wheel disc and wheel rim or can be placed therebetween under compression to form a compression bond. In addition, the arrangement is such that the radial load upon the wheel resulting from the weight of the vehicle is carried by the rubber elements, and the driving and braking torque are transmitted between the wheel disc and the wheel rim by the rubber elements.

It is a further object of the invention to provide the construction mentioned above without materially changing the construction of the wheel rim and with a minimum amount of change in the wheel disc. As a result, the structure is relatively simple and inexpensive to manufacture.

Another object of the invention is to provide a vehicle wheel in which the wheel disc is insulated from the wheel rim by rubber elements, and in which the insulating rubber elements are located at a miximum radius from the center of the wheel so that the unit loading of the rubber is relatively low.

Still another object is to provide a construction such as mentioned above in which the insulating elements are positioned in aligned depressions formed in the wheel disc and in the wheel rim so that the driving and braking torque can be transmitted between the disc and the rim. The resilient elements on opposite sides of the rim may be staggered circumferentially with respect to each other so as to minimize the reduction in width of the well of a drop center type rim and to prevent material interference with the use of the well in assembling and disassembling the tire from the rim.

Other objects and advantages of the invention will be made more apparent as this description proceeds, particularly when considered in connection with the accompanying drawings, in which:

Figure 1 is a side elevational view, partly broken away and in section, of a vehicle wheel embodying the present invention.

Figures 2 and 3 are cross sectional views taken substantially on the planes indicated by the lines 2—2 and 3—3 respectively of Figure 1.

Figure 1:
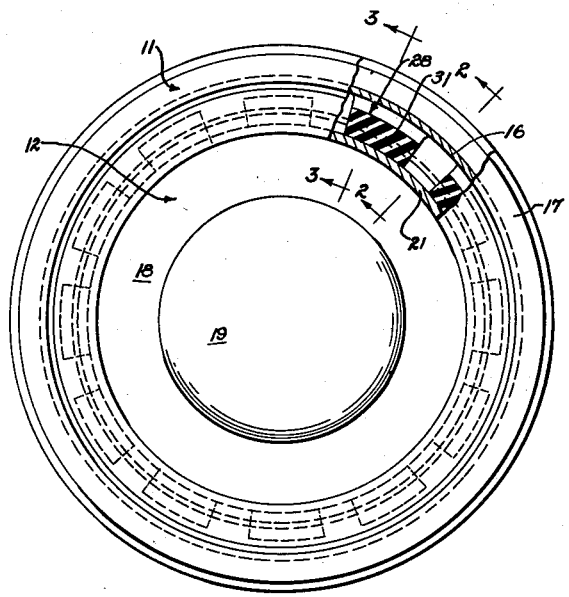
Figure 2:
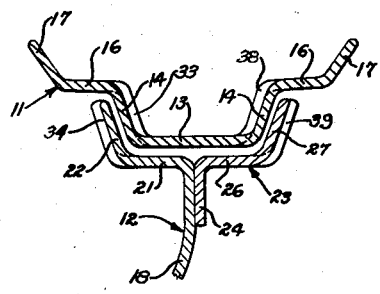

Referring now to the drawings, and particularly to the form of the invention shown in Figures 1 to 4 inclusive, the reference character 11 indicates a wheel rim of the drop center type encircling a wheel disc 12 preferably of the pressed steel type. The drop center rim 11 has the usual well which comprises the base 13 and the side walls 14. Radially outwardly of the side walls 14 are the tire supporting flanges 16 and the tire retaining beads 17.

The wheel disc 12 comprises a dished body portion 18 which is apertured to provide access to the wheel bolts, the aperture being closed by the hub cap 19. Adjacent its outer periphery the body portion 18 of the wheel disc is bent outwardly to form an axially extending annular portion 21 extending parallel to and spaced radially inwardly from the base 13 of the rim. The wheel disc then continues into an outwardly inclined side flange 22 which extends generally parallel to the side wall 14 of the rim, being spaced therefrom in an outboard direction. A retaining ring 23 is provided on the inboard side of the wheel disc 12 and is formed with a radial flange 24 which may be bolted, riveted, spot welded, projection welded, or otherwise suitably secured to the body portion 18 of the wheel disc. Bolts or other detachable means are used if it is desired to removably connect the retaining ring 23 to the wheel disc to facilitate future maintenance or repair. Inasmuch, however, as the vehicle wheel of the present invention is of sturdy, permanent construction, it is extremely unlikely that any repairs will be necessary even after extended use, and consequently the retaining ring can be permanently attached to the wheel disc by welding or riveting. Another advantage of welding the ring to the disc is that the outboard face of the wheel disc is not marred by rivet or bolt heads extending therefrom. The retaining ring 23 also has an axially extending annular portion 26 extending parallel to and spaced radially inwardly from the base 13 of the rim, and an inclined side flange 27 extending parallel to the side wall 14 of the rim and spaced therefrom in an inboard direction.

It will be seen from the foregoing description that the construction of the wheel disc 18 and the retaining ring 23 is such as to embrace therebetween the well portion of the drop center rim. Furthermore, clearance is provided at all points between the rim and the wheel disc so that there can be no metal to metal contact which would result in transmitting vibrations originating in the tire carcass through the vehicle wheel to the frame and body of the car.

Figure 3:
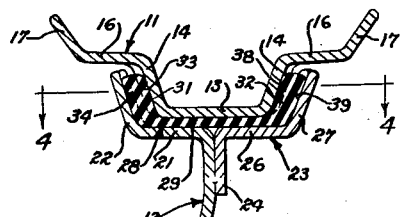
Figure 4:
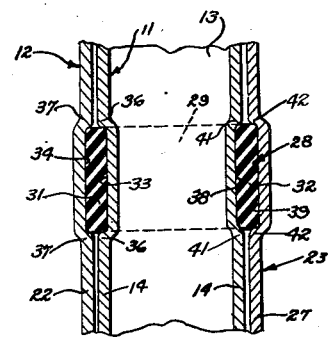
Figure 4 is a cross sectional view taken substantially on the plane indicated by the line 4—4 of Figure 3.

As best seen in Figures 1, 3 and 4, a plurality of generally U-shaped resilient elements, in the form of rubber blocks 28, are interposed between the wheel rim and the wheel disc. The rubber blocks are spaced from each other circumferentially, completely around the wheel and function to effectively insulate the wheel disc from the wheel rim. In addition, the blocks not only carry the weight or load of the vehicle but also serve to transmit the driving and braking torque between the wheel disc and the wheel rim.

Each rubber block 28 has a flat base portion 29 interposed in the clearance space between the base 13 of the rim and the annular portions 21 and 26 of the wheel disc 12 and the retaining ring 23 respectively. The base portion 29 functions to carry the radial load resulting from the weight of the vehicle while at the same time insulating the wheel disc from the rim. Extending generally radially outwardly from the opposite sides of the base portion 29 of each rubber block 28 are a pair of side flanges 31 and 32. The side flanges 31 and 32 are preferably, although not necessarily, somewhat thicker than the base portion 29. The outboard side flanges 31 are seated in aligned depressions 33 and 34 formed respectively in the outboard side wall 14 of the rim and the side flange 22 of the wheel disc. These depressions have a circumferential dimension corresponding to the length of the rubber blocks and, as best seen in Figure 4, form pockets for receiving the side flanges 31 of the blocks. The shoulders 36 and 37 thus formed in the wheel rim and wheel disc respectively at opposite ends of the depressions 33 and 34 engage opposite ends of the rubber blocks 28 and enable the driving and braking torque to be transmitted between the wheel disc and the wheel rim through the rubber blocks.

In similar fashion, depressions 38 and 39 are formed in the inboard side wall 14 of the rim and the side flange 27 of the retaining ring 23 respectively, providing pockets for the inboard side flanges 32 of the rubber blocks. The shoulders 41 and 42 thus formed in the rim and in the retaining ring respectively also enable driving and braking torque to be transmitted between the disc and the rim. This function is achieved without the necessity of providing any metal to metal contact. In addition to transmitting driving and braking torque and insulating the wheel disc from the rim, the side flanges 31 and 32 of the rubber blocks, being inclined with respect to a vertical plane through the wheel, assist in carrying part of the radial load of the vehicle.

Preferably the rubber blocks 28 are placed under compression during the assembly of the wheel, the compression bond together with the depressions in the wheel rim and the wheel disc being sufficient to retain the rubber blocks in position. If desired, however, the blocks may be cemented to the disc and to the rim.

The present invention should not be confused with the large class of prior art known as resilient wheels. Resilient wheels are designed for the purpose of augmenting or eliminating the usual suspension system of a vehicle. The present invention, on the other hand, is designed for the purpose of preventing the transmission to the chassis and body of vibrations originating at the tire. These vibrations are not of such magnitude that they need be eliminated or lessened for the purpose of improving the riding quality of the vehicle and the comfort of the passengers, but are small in magnitude and possess a sufficiently high frequency to set up vibrations which when transmitted to the vehicle and to the body panels produce objectionable vibrations and noises. The structure described in this application has been particularly designed to correct this defect in ordinary vehicle construction and is entirely foreign to the suspension system of the vehicle.

Figure 5:
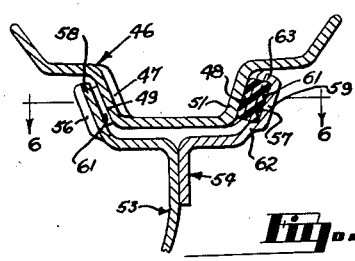
Figure 5 is a cross sectional view similar to Figure 3 but illustrating a modification.
Figure 6:
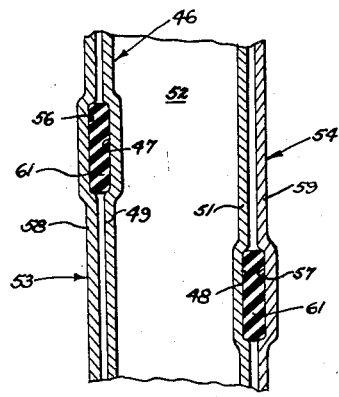
Figure 6 is a cross sectional view taken substantially on the plane indicated by the line 6—6 of Figure 5.

A modification of the invention is shown in Figures 5 and 6, in which the insulating means between the wheel disc and the wheel rim comprise a plurality of angularly spaced rubber blocks interposed between the side walls of the rim and disc, the blocks on opposite sides of the rim being staggered with respect to each other. The wheel rim 46 of the modification is generally the same in construction as the wheel rim 11 shown in Figures 1 to 4 inclusive, the single exception being that the depressions 47 and 48 in the outboard side wall 49 and the inboard side wall 51 of the rim are staggered with respect to each other in a circumferential direction. With this arrangement the decrease in the width of the well 52 of the drop center rim adjacent the depressions 47 and 48 is held to a minimum.

The wheel disc 53 and the retaining ring 54 are also generally similar to the wheel disc and retaining ring of the principal form of the invention, except that in this case the depressions 56 and 57 in the outboard side flange 58 of the wheel disc 53 and the inboard side flange 59 of the retaining ring 54 respectively are offset with respect to each other in a circumferential direction and are arranged in axial alignment with the depressions 47 and 48 formed in the wheel rim. The aligned depressions thus form pockets for receiving the rubber blocks 61 which are assembled therein under compression, or which, if desired, may be cemented therein.

Referring to Figure 5, it will be seen that the side flanges 58 and 59 of the wheel disc 53 and retaining ring 54 respectively are formed with radially inner and outer shoulders 62 and 63 at opposite extremities of the depressions 56 and 57. These shoulders engage opposite end walls of the rubber blocks 61 and prevent radial displacement of the latter. Inasmuch as the blocks 61 are set at an angle they carry the radial load or weight of the vehicle as well as transmit the driving and braking torque between the wheel disc and the wheel rim. Furthermore, as they form the sole connection between the disc and rim, all metal to metal contact is eliminated and the wheel disc is effectively insulated from the rim.

In both forms of the invention shown in the drawings and described above, it will be seen that the wheel disc is insulated from the wheel rim in zones having a maximum radius and as close as possible to the source of the vibrations. Thus, not only are the rubber blocks so located so as to most effectively eliminate the transmission of vibrations to the chassis and body, but the unit loading of the rubber is relatively low.

It will be understood that the invention is not to be limited to the exact construction shown and described, but that various changes and modifications may be made without departing from the spirit and scope of the invention, as defined in the appended claims.

What is claimed is:

1. In a vehicle wheel, in combination, a wheel rim retainer, a wheel rim encircling said retainer and spaced therefrom, and a plurality of circumferentially spaced generally U-shaped rubber elements intermediate said retainer and said rim, the base of each of said U-shaped rubber elements being disposed generally axially and arranged to carry the radial load upon said wheel in compression, and the side flanges of said U-shaped rubber elements being disposed generally radially and seated within depressions formed in said retainer and said rim to transmit driving and braking torque therebetween.

2. In a vehicle wheel, in combination, a wheel rim of the drop center type, a rim retainer provided at its periphery with relatively outwardly flaring side flanges embracing the well of said drop center rim, said retainer and said rim being spaced from each other, a plurality of displaced nonapertured rubber elements intermediate said outer portions of the retainer and the well of said wheel rim, said rubber elements forming the sole connection between said retainer and said rim and being arranged to transmit driving and braking torque therebetween and retainers on said flaring side flanges engaging and restraining said rubber elements against circumferential movement relative thereto.

3. In a vehicle wheel, in combination, a wheel rim of the drop center type having a well comprising an axially extending base and inclined side walls extending outwardly from said base and forming obtuse angles with the axis of said wheel, a rim retainer provided with an axially extending annular portion spaced radially inwardly from the base of said rim and outwardly inclined side flanges spaced axially outwardly from the side walls of said rim and forming obtuse angles with the axis of said wheel, and a plurality of circumferentially spaced resilient elements intermediate the side walls of said rim and the adjacent side flanges of said rim retainer held under both shear and compression forces thereby, said resilient elements providing the sole connections between said rim retainer and said rim and insulating said retainer and said rim from each other.

4. In a vehicle wheel, in combination, a wheel rim of the drop center type, a rim retainer provided at its periphery with portions embracing the well of said drop center rim, said retainer and said rim being spaced from each other, and a plurality of circumferentially spaced generally U-shaped rubber members intermediate said peripheral portions of the rim retainer and the well of said wheel rim, each of said U-shaped rubber members having its base interposed between the base of said drop center rim and the adjacent portion of said rim retainer and having its generally radially outwardly extending flanges interposed between the side walls of the well of said drop center rim and the adjacent portions of said rim retainer.

5. In a vehicle wheel, in combination, a wheel rim of the drop center type, a rim retainer provided at its periphery with portions embracing the well of said drop center rim, said retainer and said rim being spaced from each other, and a plurality of circumferentially spaced rubber blocks interposed between the side walls of the well of said drop center rim and the adjacent walls of said rim retainer, the blocks on opposite sides of said rim being staggered circumferentially with respect to each other and being seated in aligned depressions formed in the adjacent walls of said rim and rim retainer to form driving connections therebetween.

6. In a vehicle wheel, in combination, a wheel rim of the drop center type having a well comprising an axially extending base and inclined side walls extending from said base, a rim retainer provided with an axially extending annular portion spaced from the base of said rim and outwardly inclined side flanges spaced from the side walls of said rim, and a plurality of circumferentially spaced rubber blocks seated in aligned depressions formed in the side walls of said drop center rim and the adjacent side flanges of said rim retainer, the rubber blocks on opposite sides of said rim being staggered circumferentially with respect to each other completely around the circumference of said rim and providing the sole connections between said rim and said rim retainer and insulating said rim and said rim retainer from each other.

7. In a vehicle wheel, in combination, a wheel rim of the drop center type having a well comprising an axially extending base and inclined side walls extending from said base, a rim retainer provided with an axially extending annular portion spaced from the base of said rim and outwardly inclined side flanges spaced from the side walls of said rim, and a plurality of circumferentially spaced generally U-shaped rubber blocks, each of said rubber blocks having a base portion interposed between the base of said drop center rim and the axially extending annular portion of said rim retainer and a pair of outwardly inclined side flanges interposed between the side walls of said drop center rim and the adjacent side flanges of said rim retainer, the base portions of said rubber blocks forming the principal weight carrying means between said rim retainer and said rim and the side flanges of said rubber blocks forming the principal torque transmitting means between said rim retainer and said rim.

8. In a vehicle wheel, in combination, a generally channel shaped wheel rim having outwardly flaring side flanges, a generally channel shaped rim retainer coaxial with said wheel rim and spaced radially inwardly therefrom, said rim retainer having outwardly flaring side flanges partially embracing said channel shaped wheel rim, and displaced resilient cushioning means under both shear and compression forces between the opposed surfaces of the outwardly flaring flanges of said channel shaped retainer and said channel shaped rim.

CLYDE R. PATON.

REFERENCES CITED

The following references are of record in the file of this patent:

UNITED STATES PATENTS

| Number | Name | Date |
| --- | --- | --- |
| 447,822 | Hall | Mar. 10, 1891 |
| 1,542,943 | Josephson | June 23, 1925 |
| 1,654,565 | Wagenhorst | Jan. 3, 1928 |
| 2,242,425 | Ferro | May 20, 1941 |